United States Patent [19]

Heckelman, James D. et al.

[11] 4,319,659

[45] Mar. 16, 1982

[54] COMPARTMENT LOCKING MEANS AND THERMAL ACTUATOR THEREFOR

[76] Inventors: Heckelman, James D., RR #2 Wikel Rd., Huron, Ohio 44839; William P. Hickey, 908 Spitzer Bldg., Toledo, Ohio 43604

[21] Appl. No.: 117,832

[22] Filed: Feb. 4, 1980

[51] Int. Cl.[3] ........................ B60R 25/00; E05F 15/20

[52] U.S. Cl. .......................................... 180/271; 49/2; 49/31; 60/516; 60/531; 60/643; 160/6; 292/DIG. 65; 292/DIG. 66

[58] Field of Search ........................ 180/271, 289, 286; 49/1, 2, 31; 292/DIG. 66, DIG. 65, 201; 160/6; 60/531, 530, 516, 643

[56] References Cited

U.S. PATENT DOCUMENTS

| | | | |
|---|---|---|---|
| 2,147,695 | 2/1939 | Folds | 60/531 |
| 2,882,987 | 4/1959 | McDougal, Sr. et al. | 180/289 |
| 3,664,698 | 5/1972 | Stropkay | 60/531 X |

*Primary Examiner*—Joseph F. Peters, Jr.
*Assistant Examiner*—Milton L. Smith
*Attorney, Agent, or Firm*—William Preston Hickey

[57] ABSTRACT

A fluid pressure motor having a normally used internal electrical heating element which vaporizes internal fluid to actuate the motor. The motor further includes means in heat transfer proximity to the outside of the motor which can be caused to convert its stored energy to sufficient heat to actuate the motor.

22 Claims, 7 Drawing Figures

COMPARTMENT LOCKING MEANS AND THERMAL ACTUATOR THEREFOR

TECHNICAL FIELD

The present invention relates to an actuator having two separate and distinct means for powering itself; and more particularly to an actuator which can be housed in the area it unlocks since it can be actuated during failure of its normally used system of actuation by another independent system.

BACKGROUND OF THE INVENTION

Although the present invention will have many other uses, it is particularly adapted for use in antitheft systems for automotive vehicles. In the automotive antitheft systems with which we are most particularly concerned an actuator of some type must be installed under the hood to release the hood latch mechanism. An electronic logic system is also housed under the hood and is used to control the actuation of the actuator, so that it can not be reached by unauthorized people. A push botton console or other means is located in the driver's compartment with wires extending from the console to the logic system under the hood. One problem that can occur with such a system is that a fire in the engine compartment can damage the electronic circuitry so that the actuator can not be actuated, and the hood opened to put out the fire.

An object of the present invention is the provision of a new and improved actuator having both a normally used electrical system for producing its actuation; and a second emergency actuating system which is separate and distinct from the normal actuating system.

A more particular object of the present invention is the provision of a new and improved electrically powered actuator which is automatically actuated when the actuator is exposed to fire.

Further objects and advantages of the invention will become apparent to those skilled in the art to which the invention relates from the following description of applicants' preferred embodiments.

DESCRIPTION OF THE PREFERRED EMBODIMENTS

Figure 1:
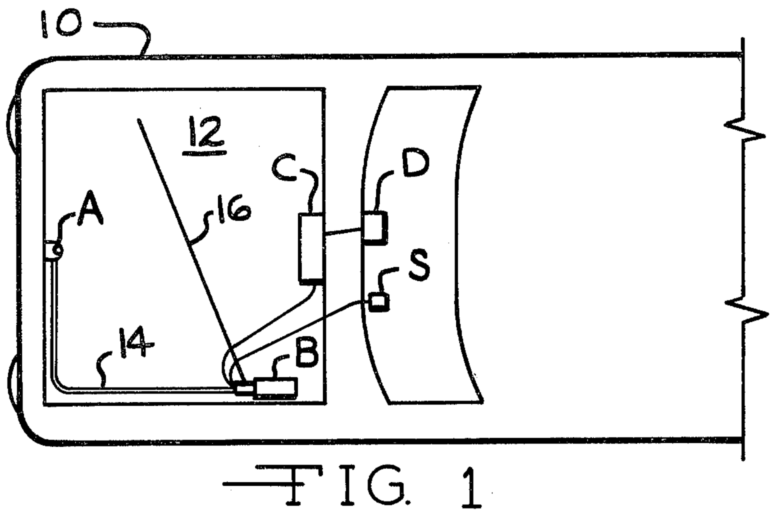
FIG. 1 is a fragmentary plan view of an automobile showing the hood removed to expose a hood unlatching system which embodies the present invention.
Figure 2:
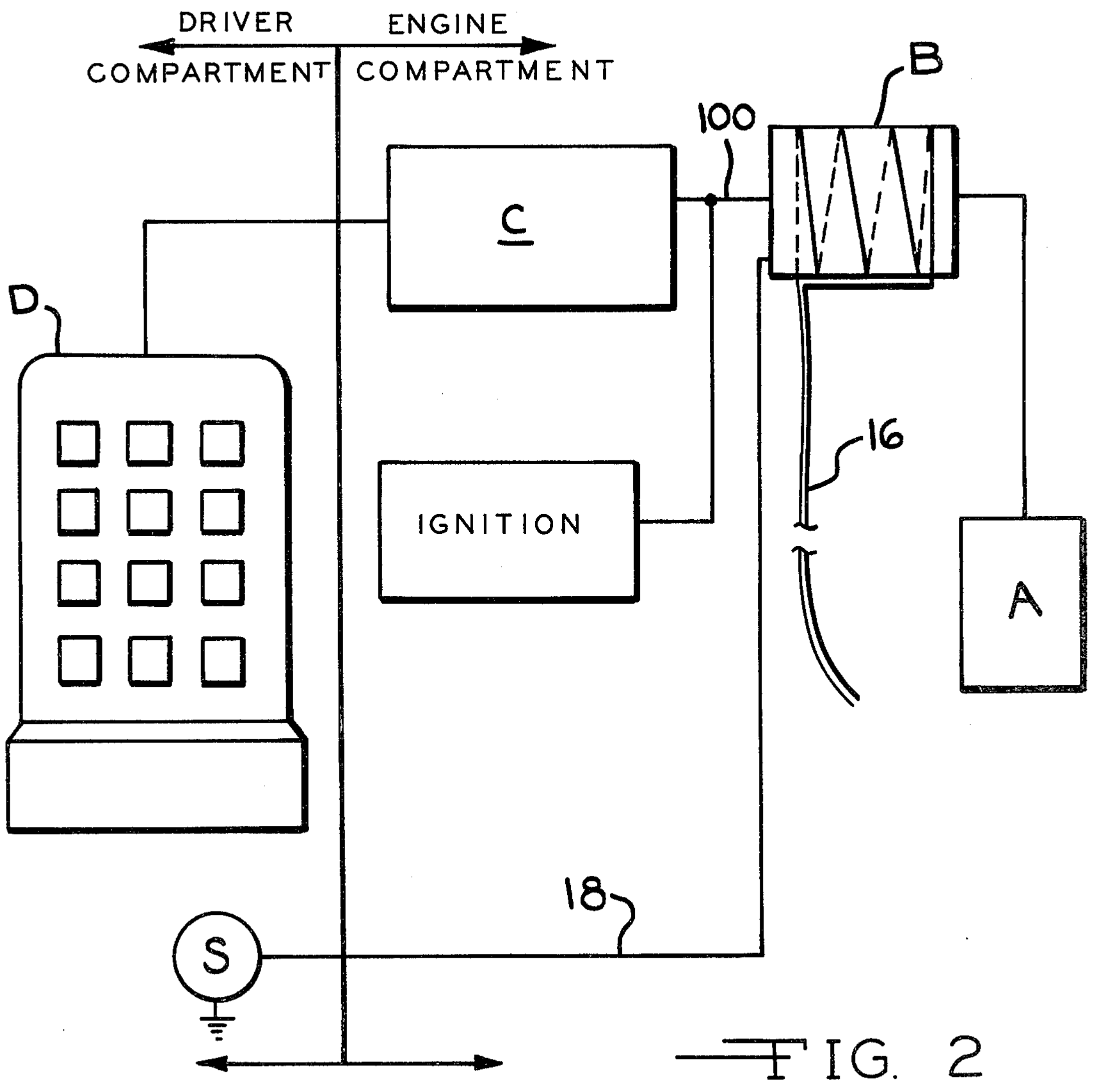
FIG. 2 is a schematic block diagram of an automotive antitheft system embodying the present invention.

FIG. 1 of the drawings shows the front portion of an automobile 10 with the hood removed so that the engine compartment 12 is exposed. A conventional hood latch mechanism is shown at A having a pull cable 14 extending to a position adjacent the firewall where the actuator B of the present invention is mounted. FIG. 1 also shows a section of ignition fuse 16, of the type used to ignite fireworks, or blasting explosive, extending from the actuator to a position over the engine. It will be understood that the ignition fuse 16 extends up beneath the hood and is secured thereto by suitable clips not shown. The actuator B is normally controlled by a computer module C mounted on the firewall and to which input pulses are provided by a push button console located in the driver's compartment. In the embodiment shown, the actuator B has an input terminal that is supplied with voltage by the module C and an output terminal that is connected by wire 18 to a grounding switch located in the driver's compartment. FIG. 2 of the drawings is a block diagram of the system with the firewall being indicated by the line 20. The block diagram shown in FIG. 2 is indicative of the antitheft circuitry shown and described in detail in the Heckelman and Ziemke application Ser. No. 870,338 filed Jan. 18, 1978, now abandoned in view of Continuation in Part Application Ser. No. 79,167 filed Sept. 26, 1979; and the details of which are incorporated herein by reference.

The hood latch mechanism A shown in the drawings generally comprises a support bracket 22 with adjacent upstanding sides 24 and 26. The side of the support bracket opposite the upstanding side 26 is notched as at 28 to receive the usual headed latch pin 30 that depends from the hood of an automotive vehicle. A latch plate 32 that is notched out as at 34 to receive the latch pin 30 is pivoted inwardly and to the side of the notch 28 as at 36; so that the portion of the notch 34 which grips the latch pin 30 will move away from the pin 30 as it rotates about the pivot 36. The inner side edge of the notch 34 extends generally at right angles to the line connecting the pivot and the centerline of the latch pin 30 when in its locked in position; so that the inner side edge of the notch 34 swings slightly forwardly from the position occupied by the latch pin when in its locked position; and so that downward movement of the latch pin will cam the latch plate 32 which is provided with ratchet teeth 38 which in turn are engaged by a Pawl 40 rotatably pivoted as at 42. The ratchet teeth 38 have generally square side edges facing the pivot 42 so that the Pawl 40 can prevent opening movement of the latch plate. The Pawl 40 also has a lever portion 44 for engagement by a release lever 46. The release lever 46 is pivoted adjacent its side opposite the Pawl, and has a downwardly turned end 50 for engagement with the Pawl 40. It also has an upwardly turned leg 52 having an opening therethrough for receiving the end of a pull cable 14. The latch plate is biased open, against the action of the Pawl 40, by a stiff coil spring 56; and the release lever 46 is biased away from the Pawl 40 by means of a stiff spring 58. The cable 14 extends through a suitable guide in the upstanding side 24 of the latch mechanism A.

The actuator B is capable of exerting a pushing force of approximately 20 lbs. over a distance of from ½ to approximately one inch. The actuator B generally comprises a cylindrical housing 60 made in two half sections with the periphery of a hat-shaped diaphragm 62 sealed therebetween. The center of the diaphragm is positioned against one side of a cup 64 for rolling contact therewith, and a headed push rod 66 extends through the end of the housing with its head bottomed in the cup. An internal coil spring 68 is positioned between the end of the housing and the head of the rod 66 to normally hold the push rod in a retracted position. The opposite half section of the housing 60 has two electrical terminal pins 70 sealed in the end thereof. The pins 70 are connected to a heating unit 72 that is inside a ceramic insulator sleeve 74 which spaces the unit 72 from the sidewalls of the housing. An electrically non-conductive fluid, as for example Freon, is housed within the hermetically sealed section of the housing and a cup-shaped heat shield 76 is positioned between the diaphragm 62 and heating unit 72. When 12 volt D.C. electricity is communicated with the terminal pins 70, the Freon is vaporized to expand against the diaphragm and force the push rod 66 out of the housing 60.

The actuator B can be supported in any suitable manner. As shown in the drawings it is supported in a four sided box 78, that is no part of the present invention, and which is suitably fastened to the structure of the automobile adjacent the firewall. In order to convert the pushing action of the push rod to a pulling action, the center section of a U-shaped rod 80 is threaded on to the end of the push rod 66 with its leg portions 82 and 84 extending backwardly through the four sided support box 78 to suitably support and guide the push rod. The end of the pull cable 14 extends through an opening 86 on the leg 84, and a machine screw 88 is threaded down onto the end of the pull cable 14 to lock it in place. Actuation of the push rod 66 thereby provides a pulling action on the cable 14 which unlatches the hood.

The output of the computer module C is connected to one of the terminal pins 70 by a conductor 100, while the other terminal pin 70 is connected to the grounding switch S by the conductor 18. It will therefore be seen that the computer module C will energize the heating element 72 each time that the ignition is energized, but that the actuator B will only be actuated when the grounding switch S is closed. The heating element 72 of course vaporizes the Freon which then expands to push the hatshaped diaphragm 62 outwardly, and thus force the headed push rod 66 out of the housing 60. This in turn moves the U-shaped rod 80 to pull the cable 14 and move the release lever 46 against the Pawl 40. When the Pawl 40 is moved clear of the latch plate 32, the coil spring 56 moves the latch plate 32 clear of the latch pin 30.

Figure 3:
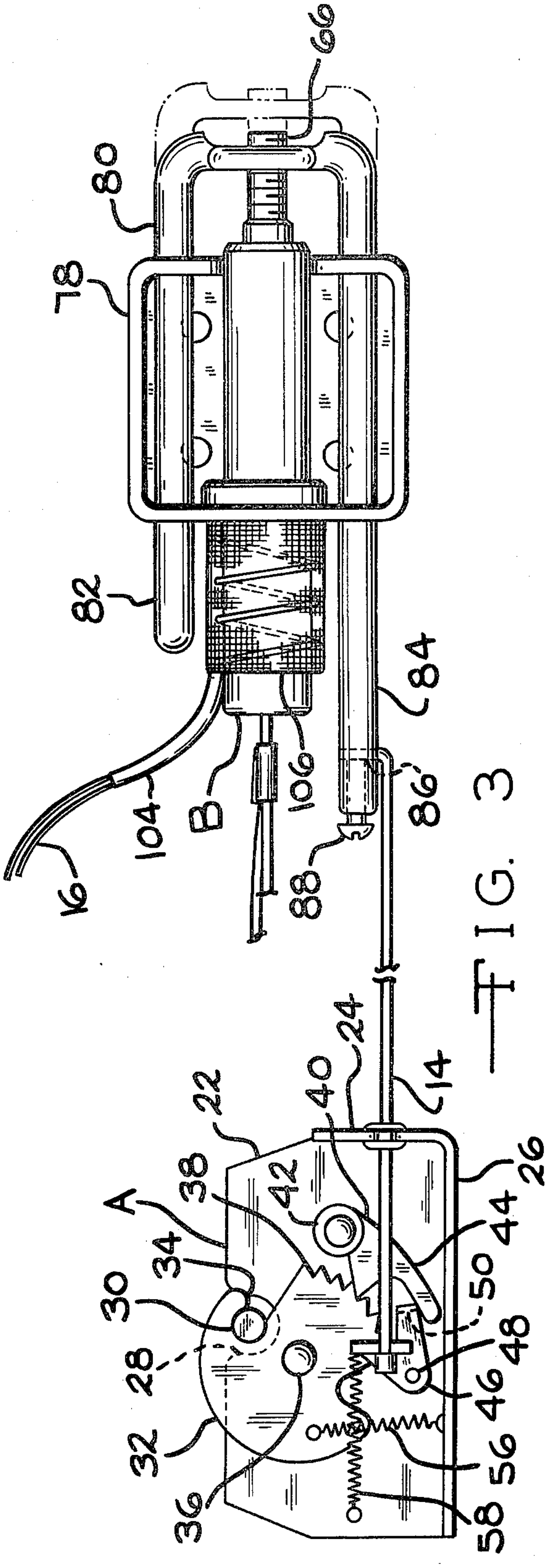
FIG. 3 is a plan view of a hood latching mechanism, the release cable for which is pulled by an actuator of the present invention.
Figure 4:
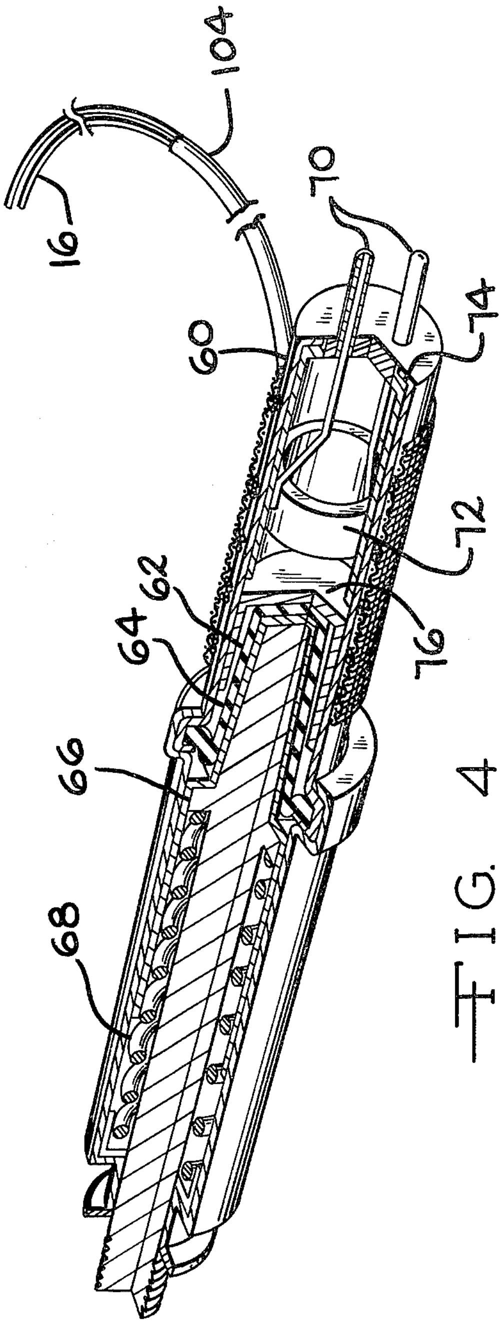
FIG. 4 is an oblique cut away view of an actuator embodying principles of the present invention.

According to principles of the present invention heating means are provided externally of the housing 60 in such an arrangement that heat therefrom flows through the housing to vaporize the Freon therein and produce an actuation of the hood latch release mechanism. It will be seen that the vaporized Freon can only condense and the unit return to normal, by the dissipation of heat through the housing 60. It is important therefore, that the external heating means of the present invention not interfer with dissipation of heat from the housing 60 to any appreciable extent. The heating means shown in FIGS. 3 and 4 generally comprises a length of fuse cord 16 that is folded over against itself with the folded over end being slipped through a section of flexible tube, such as electronic insulating spaghetti 104. The fuse cord 16 extends through the spaghetti 104 and is wrapped around the housing 60 with sufficient length to provide actuation of the unit. The adjacent end of the spaghetti 104 is laid lengthwise over the housing 60, and is held in place by an open mesh sleeve, made for example, from a section of knitted tubing, and which sleeve 106, resiliently holds the spaghetti in place. The sleeve 106 can be held in position in any suitable manner as for example by twist wires. The sleeve shown is made of a combustible heat shrinkable mesh, so that after being slipped over the housing, it can be heated sufficiently to shrink down upon the housing 60 and hold the assembly in place. It will be understood that where the actuator B is installed in an area that is exposed directly to fire, the cord 16 need not extend away from the unit. It will also be understood that the sleeve 106 may contain or be impregnated with a material that bursts into flame at a predetermined temperature, as for example 350° F. It will also be understood that the sleeve 106 can be made of paper or some other flammable material that is wrapped around the housing 60 and secured in place as by twist wires, rubber bands, etc. It will also be understood that the sleeve may contain or comprise a combustible metal wool or gauze in contact with the housing in such manner that it not only conducts heat out of the housing, but upon burning, supplies the necessary heat to actuate the unit.

Figure 5:
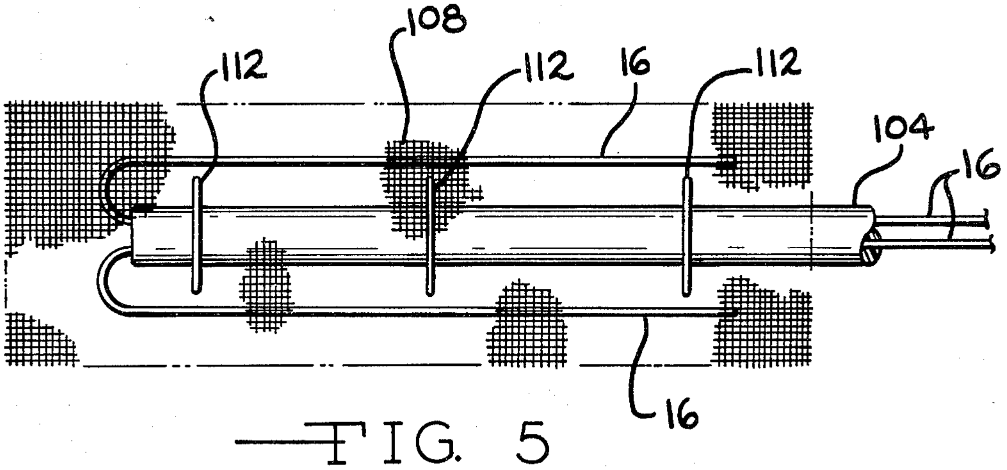
FIG. 5 is a plan view of a heating element embodying principles of the present invention.
Figure 6:
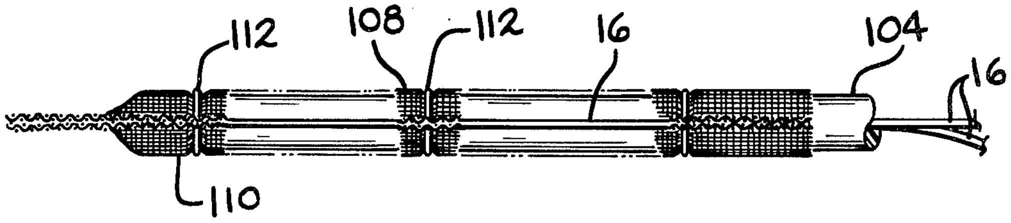
FIG. 6 is a side elevational view of the heating element shown in FIG. 5.

FIGS. 5 and 6 show another embodiment of heating element which can be wrapped around the housing 60 and suitably secured thereto as by twist wires etc. The heating element shown in FIGS. 5 and 6 generally comprises a pair of strips of copper fly screening 108 and 110 with one end of the spaghetti 104 sandwiched therebetween. The fuse cord 16 extends through the spaghetti 104 with sections thereof bent around to extend an opposite sides of the spaghetti. The fly screening 108 and 110 is suitably clamped down over the spaghetti by a plurality of staples 112. The sandwich so produced is installed by wrapping it around the housing 60, and securing it in place as by twist wires etc. with the spaghetti leading away from the unit to protect the fuse cord during flexing as will occur when the hood is opened and closed. The spaghetti 104 is preferably made of a flammable material, and it will be seen that other flammable materials including magnesium gauze may be sandwiched between the screening to provide the necessary heat for actuating the unit.

Figure 7:
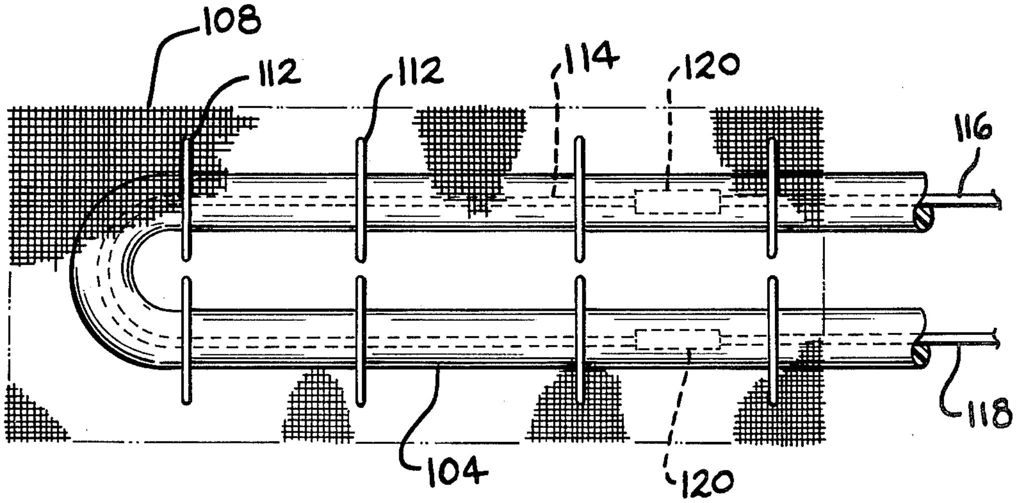
FIG. 7 is a plan view, similar to FIG. 5, but showing still another embodiment of heating element.

In the embodiment shown in FIG. 7, an electrical heating element, as for example a section of Nicrome wire 114, has electrical lead wires 116 and 118 fastened to its ends as by means of crimping connectors 120. The section of spaghetti 104 is slipped over the Nicrome wire 114 and connectors 120, and the assembly is bent U-shaped and fastened between the fly screening 108 and 110 by means of staples 112, as was done in the previous embodiment. The embodiment shown in FIG. 7, when installed in the same manner as the embodiment of FIGS. 5 and 6 will provide an electrical heating system separate and apart from the heating unit 72 and its actuating system. The Nicrome wire 114 may supply all of the heat that is necessary to actuate the unit, alternatively, flammable materials as for example magnesium gauze may be placed at locations along the wire 114 inside of the spaghetti, so that the Nicrome wire 114 need only act as an igniter for the gauze, and so that the gauze supplies most of the heat necessary to actuate the unit.

While the invention has been described in considerable detail, we do not wish to be limited to the particular details shown and described, but it is our intention to cover hereby all modification, adaptations, and arrangements thereof which come within the practice of those skilled in the art to which the invention relates and which come within the purview of the following claims.

We claim:

1. An actuator comprising: a housing having a hermetically sealed chamber therein; a movable wall in said chamber; an electrical heating element in said hermetically sealed chamber with input and output terminals extending externally of said housing; an expansible fluid inside said hermetically sealed chamber to be heated by said electrical heating element; and means storing energy convertible to heat on the outside of said housing arranged so that when triggered heat therefrom will be transferred through said housing to expand said fluid and actuate said movable wall independently of actuation by said electrical heating element.

2. The actuator of claim 1 wherein said means comprises combustible material fastened to the outside of said housing.

3. The actuator of claim 2 wherein said combustible material includes a fuse cord leading away from said housing and functioning to bring ignition from a spaced apart area.

4. The actuator of claim 2 wherein said combustible material is a foraminous material which allows circulation of air therethrough.

5. The actuator of claim 2 wherein said combustible material is a foraminous sleeve.

6. The actuator of claim 5 wherein said sleeve is a knit material.

7. The actuator of claim 1 wherein said means comprises: a flexible tube extending over said housing, a combustible fuse cord extending through said flexible tube, a wrapping extending around said housing and flexible tube, and means fastening said wrapping to said housing.

8. In an antitheft system for a vehicle having an engine compartment, and a latch for securing said engine compartment, a thermal actuator in said engine compartment for unlatching said latch when actuated, said thermal actuator having a housing for a thermal expansible fluid and an electrical heating element for heating said fluid when said heating element is energized, logic circuitry in said engine compartment for actuating said electrical heating element when said logic circuitry receives a specific logic input from said driver's compartment, and combustible material on the outside of said housing for producing external heat to actuate said thermal actuator when said engine compartment becomes overheated.

9. The system of claim 8 wherein said combustible material is ignited by fire in said engine compartment.

10. In a closure system for a compartment secured by a latch, a thermal actuator in said compartment for opening said latch, said thermal actuator having an expansible fluid and an electrical heating element internally for generating pressure to open said latch when said electrical heating element is energized, and energy storing and heat liberating means on the outside of said thermal actuator for converting stored energy to heat and causing a sufficient flow of heat into said thermal actuator to open said latch when an over heated condition exists in said compartment.

11. The system of claim 10 wherein said means is flamable to burst into flame at a generally predetermined temperature.

12. A thermal actuator comprising: a housing having a hermetically sealed chamber therein: a movable wall at one end of said chamber; an electrical heating element in said hermetically sealed chamber with input and output terminals extending externally of said housing; an expansible fluid inside said hermetically sealed chamber to be heated by said electrical heating element; and a combustible material externally of said housing and arranged so that heat of combustion thereof will be transferred through said housing to expand said fluid and actuate said moveable wall.

13. The thermal actuator of claim 12 wherein the combustible material has breather openings therethrough communicating with the housing.

14. The thermal actuator of claim 13 wherein said combustible material is an open weave cloth.

15. The thermal actuator of claim 13 wherein the combustible material contains an impregnant designed to burst into flame at a predetermined temperature below 350° F.

16. A thermal actuator comprising: a generally cylindrically shaped housing having a hat shaped diaphragm with its periphery sealed to said housing to close off one end of a hermetically sealed chamber; an electrical heating element in said hermetically sealed chamber; an expansible fluid in said hermetically sealed chamber to be heated and expanded by said heating element; an actuator rod bearing against the side of said diaphragm opposite said hermetically sealed chamber and extending externally of said housing; means for biasing said actuator rod against said diaphragm in a direction to reduce the size of said hermetically sealed chamber; and a combustible material on the outside of said housing in position to transmit its heat of combustion through said housing to said expansible fluid; and whereby fire externally of said actuator will actuate said actuator rod.

17. The actuator of claim 16 wherein said expansible fluid is a liquid fluorocarbon at room temperature.

18. The actuator of claim 16 wherein said combustible material has openings therethrough for heat transfer from the environment to said housing.

19. The actuator of claim 18 wherein said combustible material has an impregnant therein designed to burst into flame at a predetermined temperature.

20. An actuator comprising: a housing having a hermetically sealed chamber therein; a movable wall at one end of said chamber; an electrical heating element in said hermetically sealed chamber with input and output terminals extending externally of said housing; an expansible fluid inside said hermetically sealed chamber to be heated by said electrical heating element; a pair of screens on the outside of said housing; a flexible tube between said screens; a combustible fuse cord extending through said flexible tube; and means fastening said flexible tube to said screens and said screens to said housing.

21. The actuator of claim 20 wherein said screens are stapled together over said tube; and said screens are wrapped around said housing and fastened into position.

22. The actuator of claim 21 including an ignitable metal between said screens in position to be ignited by said fuse cord.

* * * * *